Dec. 9, 1924.

A. S. HUSTED

KALEIDOSCOPE

Filed Sept. 18, 1922

1,518,204

Inventor
Addison S. Husted
by J.W.m Ellis
Attorney

Patented Dec. 9, 1924.

1,518,204

UNITED STATES PATENT OFFICE.

ADDISON S. HUSTED, OF ORCHARD PARK, NEW YORK.

KALEIDOSCOPE.

Application filed September 18, 1922. Serial No. 588,790.

*To all whom it may concern:*

Be it known that I, ADDISON S. HUSTED, a citizen of the United States of America, and a resident of the village of Orchard Park, county of Erie, and State of New York, have invented a new and useful Kaleidoscope, of which the following is a full, clear, and exact description.

It is well known that in kaleidoscopes it is customary to have a tube provided at its outer end with a small eye-piece, which makes it impossible for a person to view the objects of the kaleidoscope with both eyes and impossible for any number of people to view them at the same time.

The principal object of my invention has been to provide a kaleidoscope having a tube formed with a wide flaring outer end, whereby one person may view the objects with both eyes, or a number of people may view them at the same time.

Another object has been to place the tube at an angle with the revolving object-holder, whereby a large repeated image of the object will be seen, having a substantially flat field.

Furthermore, my invention provides convenient means for mounting and rotating the object-holder and also for suitably illuminating the same.

The above objects and advantages have been accomplished by the device shown in the accompanying drawings, of which:

Figure 1:
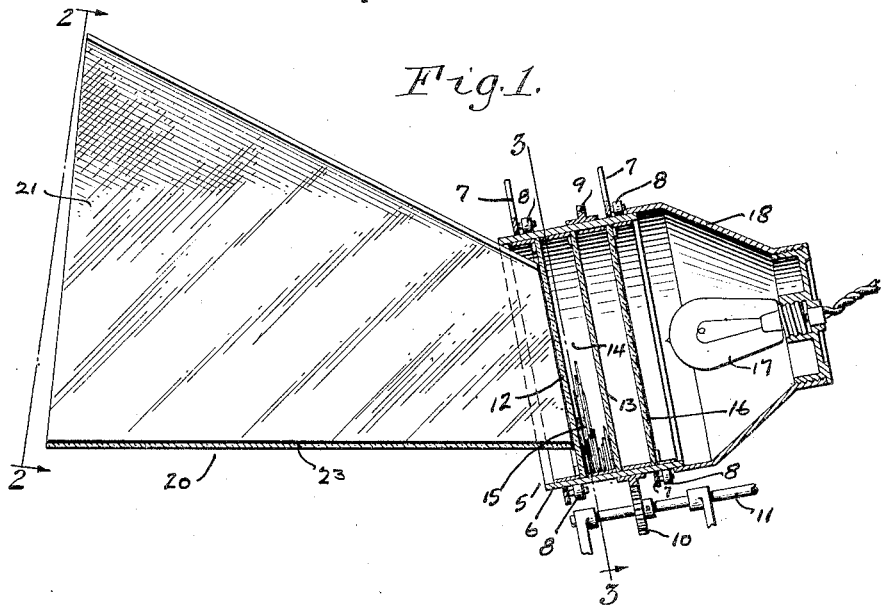
Fig. 1, is a side, sectional elevation of my complete device.

My device comprises an object-holder 5 having an outer shell 6. This shell is cylindrical in form, and is mounted within brackets 7, having rollers 8. The brackets 7 may be carried by any well known means. Carried by the casing 6 of the object-holder is a gear 9, and meshing with this gear is a pinion 10. The pinion 10 is carried by a shaft 11, which is mounted in suitable bearings and driven by any desired means.

Mounted within the casing 6 of the holder are two sheets of glass 12 and 13. These sheets of glass are separated so as to provide a space 14, and within this space are disposed the objects 15 of my device. These objects are preferably made of small particles of colored glass and celluloid, or any other desired object or figure which it is desired to display by means of the device. The combined thickness of the objects is such in relation to the width of the space 14, that there is a tendency for the objects to become slightly wedged at times, depending upon their chance arrangement so that they will sometimes be carried around with the object-holder. The particles of glass being heavier than the celluloid, there is a tendency for them to fall when they have reached a position near the top of the object-holder, whereby all the objects will become loose and fall to the bottom of the object-holder. Mounted some distance behind the sheet of glass 13 is another sheet of glass 16, preferably ground or translucent, whereby the light coming from the electric bulb 17 will be diffused over the entire area of the sheets of glass 12 and 13. The electric bulb 17 is carried at the center of a housing 18, which is arranged immediately behind the object-holder 5, it being preferable to have the object-holder arranged slightly within the casing, as shown in the drawings. The casing may be held by any suitable means (not shown). If desired, the casing may be attached to the object-holder and rotated therewith, in which case the electric current would be carried to the bulb 17 by means of brushes in a well known manner.

The tube 20 of my device is tapered in form and has its larger end at the outside. The smaller end is preferably arranged within the object-holder 5, and has its face arranged at such an angle with its axis that the axis of the rotating object-holder is at an angle therewith, whereby the multiplied image is shown in a substantially flat field. The tube of my device is, of course, triangular in cross section and comprises preferably two mirrors 21 and 22 which are joined along contacting edges, the opposite edge of each of which contacts with an edge of an opaque surface 23. With a tube of this design, it is obvious that it is not necessary that the eye be placed in a definite position when viewing the objects, but that both eyes may be used and a number of people may use the device at the same time. This feature makes my device particularly adaptable for advertising purposes.

Figure 2:
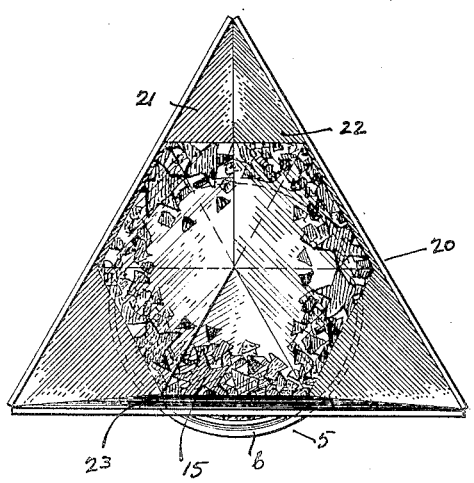
Fig. 2, is a face view of the same viewed from the line 2—2 of Fig. 1.
Figure 3:
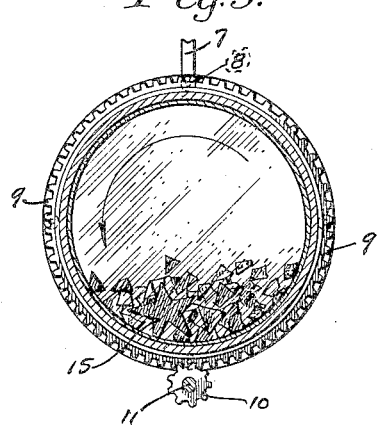
Fig. 3, is a sectional view, taken on line 3—3 of Fig. 1.

In Fig. 2, I have given a view of the objects as they appear in my kaleidoscope. From this figure it will be obvious that the point from which the objects of my device may be viewed is not limited to one particular spot, but may be seen from different angles through the large flaring mouth of the tube.

While I have shown the tube disposed in a position in which the opaque surface 23 is at the bottom, it is obvious this may be turned around so as to have the opaque surface at the top. Furthermore, the gearing and method of driving the object-holder is shown for illustrating purposes, and any suitable form of mounting or means for driving the same may be used. If desired, the glass 13 may be yieldably held in position by suitable spring means, so that the objects 15 will be held in a resilient manner. These and other modifications of the details herein shown and described may be made without departing from the spirit of my invention or the scope of the appended claims; and I do not, therefore, wish to be limited to the exact embodiment herein shown and described.

Having thus described my invention, what I claim is:

1. A kaleidoscope comprising a revolvable object-holder, and staticnarily arranged, outwardly flaring mirrors.

2. A kaleidoscope comprising a revolvable object-holder, and a stationary tapered tube, having its smaller end arranged adjacent to the object-holder.

3. A kaleidoscope comprising an object-holder, and a mirrored tube having its axis arranged at an angle with the axis of the object-holder and its sides flaring outwardly from the object-holder, whereby the multiplied image is shown on a substantially flat field.

4. A kaleidoscope comprising an object-holder, and a flaring tube having its smaller end adjacent the object-holder, the object-holder having two interspaced glass partitions and a plurality of objects disposed between the partitions, some of the objects being heavier than others, the combined thickness of the objects being substantially the same as the space between the partitions, whereby there is a tendency for the objects to become wedged between the partitions.

5. A kaleidoscope comprising an object-holder, and a flaring tube having its smaller end adjacent the object-holder, the object-holder having two interspaced glass partitions and a plurality of objects disposed between the partitions, the combined thickness of the objects being substantially the same as the space between the partitions, whereby there is a tendency for the objects to become wedged between the partitions.

In testimony whereof, I have hereunto signed my name.

ADDISON S. HUSTED